US011099695B2

United States Patent
Wang et al.

(10) Patent No.: US 11,099,695 B2
(45) Date of Patent: Aug. 24, 2021

(54) TOUCH PANEL

(71) Applicant: HENGHAO TECHNOLOGY CO., LTD., Hsin-chu County (TW)

(72) Inventors: Lung-Hui Wang, Taichung (TW); Shan-Chen Huang, Taoyuan (TW); Yung-Chih Liu, Taichung (TW)

(73) Assignee: HENGHAO TECHNOLOGY CO., LTD., Hsin-chu County (TW)

( * ) Notice: Subject to any disclaimer, the term of this patent is extended or adjusted under 35 U.S.C. 154(b) by 0 days.

(21) Appl. No.: 16/928,017

(22) Filed: Jul. 14, 2020

(65) Prior Publication Data
US 2021/0034198 A1 Feb. 4, 2021

(30) Foreign Application Priority Data

Aug. 2, 2019 (TW) .................................. 108127551

(51) Int. Cl.
*G06F 3/044* (2006.01)
(52) U.S. Cl.
CPC .......... *G06F 3/0445* (2019.05); *G06F 3/0446* (2019.05); *G06F 2203/04112* (2013.01)
(58) Field of Classification Search
CPC ................. G06F 3/0446; G06F 3/0445; G06F 2203/04112; G06F 3/0412
See application file for complete search history.

(56) References Cited

U.S. PATENT DOCUMENTS

| 2015/0009420 | A1* | 1/2015 | Zhou ...................... G06F 3/0443 |
| | | | 349/12 |
| 2015/0177871 | A1* | 6/2015 | Kim ...................... G06F 3/0446 |
| | | | 345/174 |
| 2017/0017318 | A1 | 1/2017 | Son |
| 2019/0114011 | A1* | 4/2019 | Kim .................... H01L 27/3246 |
| 2021/0208710 | * | 7/2021 | Han .................... H01L 27/3246 |

FOREIGN PATENT DOCUMENTS

| TW | I501128 | 9/2015 |
| TW | I592843 B | 7/2017 |

* cited by examiner

*Primary Examiner* — Deeprose Subedi
(74) *Attorney, Agent, or Firm* — Winston Hsu

(57) ABSTRACT

A touch panel is provided and includes a substrate, a transparent conductive layer and a non-transparent conductive layer. The transparent conductive layer and the non-transparent conductive layer are disposed on the substrate. The transparent conductive layer includes a plurality of first sensing electrode strips extending along a first direction, each of the first sensing electrode strips includes a plurality of first portions and a plurality of second portions, and each of the second portions connects adjacent two of the first portions to each other. The non-transparent conductive layer includes a plurality of second sensing electrode strips extending along a second direction, and each of the second sensing electrode strips has a mesh pattern. The first portions do not overlap the non-transparent conductive layer, and the second portions overlap the non-transparent conductive layer.

15 Claims, 9 Drawing Sheets

TOUCH PANEL

BACKGROUND OF THE INVENTION

1. Field of the Invention

The present disclosure relates to a touch panel, and more particularly, a touch panel having both a transparent conductive layer and a non-transparent conductive layer.

2. Description of the Prior Art

As new technologies are developed every day, touch panels that allow light to pass through and have a property of human/machine interaction have been widely adopted on external input interfaces of equipment, especially display devices. Conventional touch panels are formed by two sensing electrode layers insulated from each other and arranged in two different directions; additionally, to allow light to pass through, the two sensing electrode layers are formed of transparent conductive materials. However, typical transparent conductive materials have high resistances that restrict a touch resolution of the touch panel. Therefore, metal meshes are developed to be used as the two sensing electrode layers.

Even though using the metal mesh may increase the touch resolution relative to using transparent conductive materials, many disadvantages are still present as a trend of increasing touch resolution persists. First, in order to increase the touch resolution of the touch panel, e.g. to meet a specification on the touch resolution of a touch stylus, a line density of the metal mesh of the two sensing electrode layers need to be increased to increase intersection points of lines of the metal mesh of the two sensing electrode layers. In this manner, a coupling capacitance resulting from the two sensing electrode layers overlapping each other would be increased, thereby causing a resistive and capacitive load on the touch panel to be too high. Second, even though the metal mesh has low resistance, metal mesh lines do not allow light to pass through; therefore, increasing a density of the metal mesh would reduce a transmittance of the touch panel. Third, the metal mesh has a high reflectance; therefore, it is easily observed by human eyes, resulting in negative visual effect. Especially, when an outer surface of the touch panel is disposed with or coated with an anti-reflective layer, a lack of interference of light reflected by a glass/air interface causes the metal mesh of the touch panel to be even more easily observed by a user, which in turn increases visibility of the metal mesh.

SUMMARY OF THE INVENTION

One objective of the present disclosure is to provide a touch panel that uses a transparent conductive layer and a non-transparent conductive layer as a driving electrode and a sensing electrode to improve a transmittance of the touch panel, and decrease a visibility of the touch panel.

To achieve the aforementioned objective, the present disclosure provides a touch panel for detecting a position of an object. The touch panel includes a first substrate, a transparent conductive layer and a non-transparent conductive layer. The first substrate has a first surface and a second surface opposite to the first surface, and the first surface is closer to the object than the second surface. The transparent conductive layer is disposed on the second surface of the first substrate. The transparent conductive layer includes a plurality of first sensing electrode strips extending along a first direction, and each of the first sensing electrode strips includes a plurality of first portions and a plurality of second portions. Each of the second portions connects adjacent two of the first portions to each other. The non-transparent conductive layer is disposed on the second surface of the first substrate. The non-transparent conductive layer includes a plurality of second sensing electrode strips extending along a second direction, and each of the second sensing electrode strips has a mesh pattern. The first portions do not overlap the non-transparent conductive layer, and the second portions overlap the non-transparent conductive layer.

In the touch panel of the present disclosure, by using the transparent conductive layer and the non-transparent conductive layer as the driving electrode and the sensing electrode, the transmittance of the touch panel may be improved, or the touch resolution may be increased without drastically reducing the transmittance, thereby maintaining the same optical effects. Furthermore, because the non-transparent conductive layer may be metal mesh, the resistive and capacitive load on the touch panel would not be drastically increased, which in turn meets the demand of high touch resolution. Additionally, because the touch panel of the present disclosure only has one non-transparent conductive layer, the visibility issue of the non-transparent conductive layer resulting from the disposition of the anti-reflective layer may be more easily mitigated through an arrangement of an optical matching layer with the transparent conductive layer.

These and other objectives of the present invention will no doubt become obvious to those of ordinary skill in the art after reading the following detailed description of the preferred embodiment that is illustrated in the various figures and drawings.

DETAILED DESCRIPTION

The present disclosure may be understood by reference to the following detailed description, taken in conjunction with the embodiments and drawings as described below. It is noted that, for purposes of illustrative clarity and being easily understood by the readers, various drawings of this disclosure may be simplified schematic diagrams; certain elements within may not be drawn to scale. In addition, the number and dimension of each element shown in drawings are illustrative and are not intended to limit the scope of the present disclosure.

Figure 1:
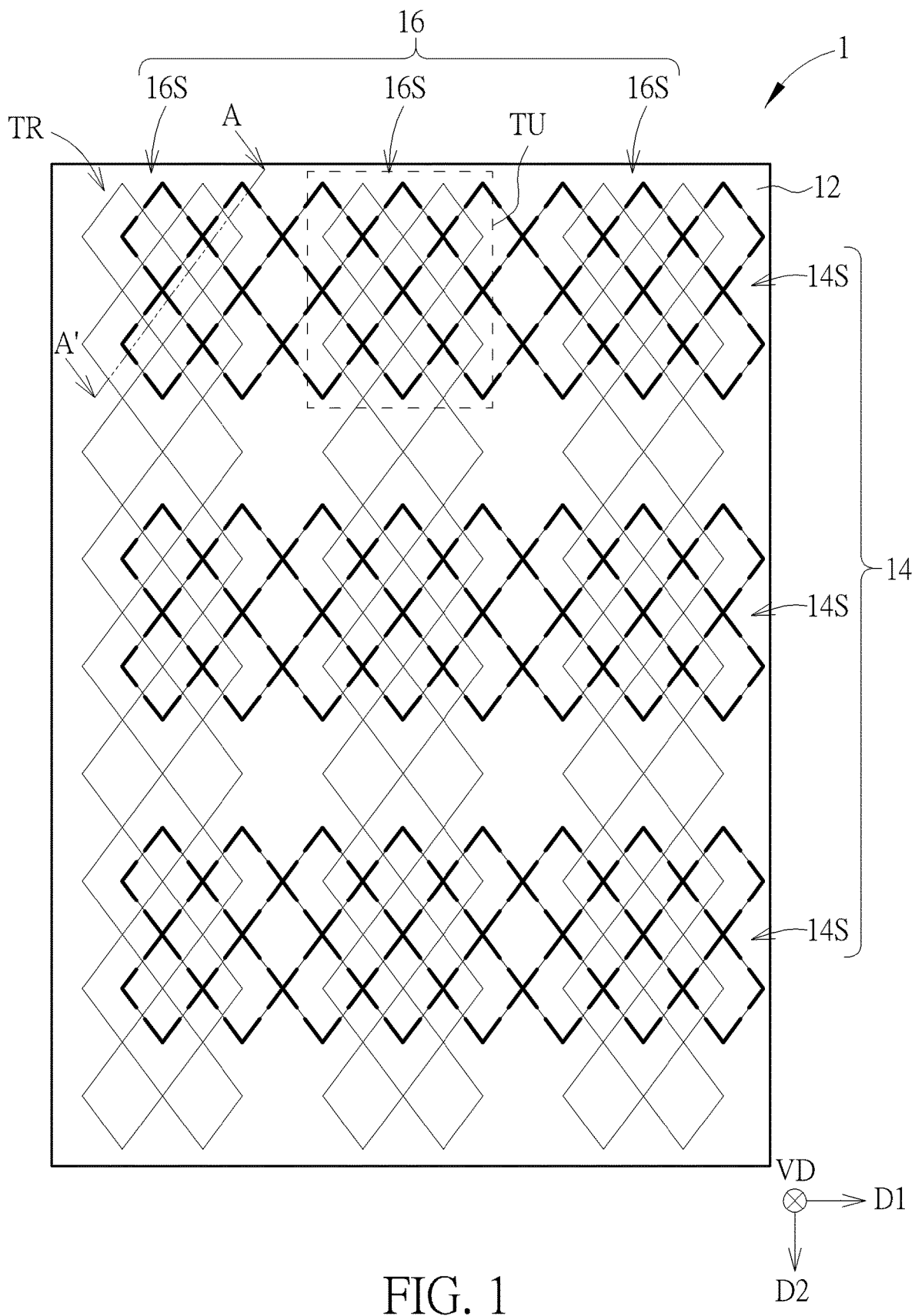
FIG. 1 illustrates a top view of a touch panel according to a first embodiment of the present disclosure.
Figure 2:
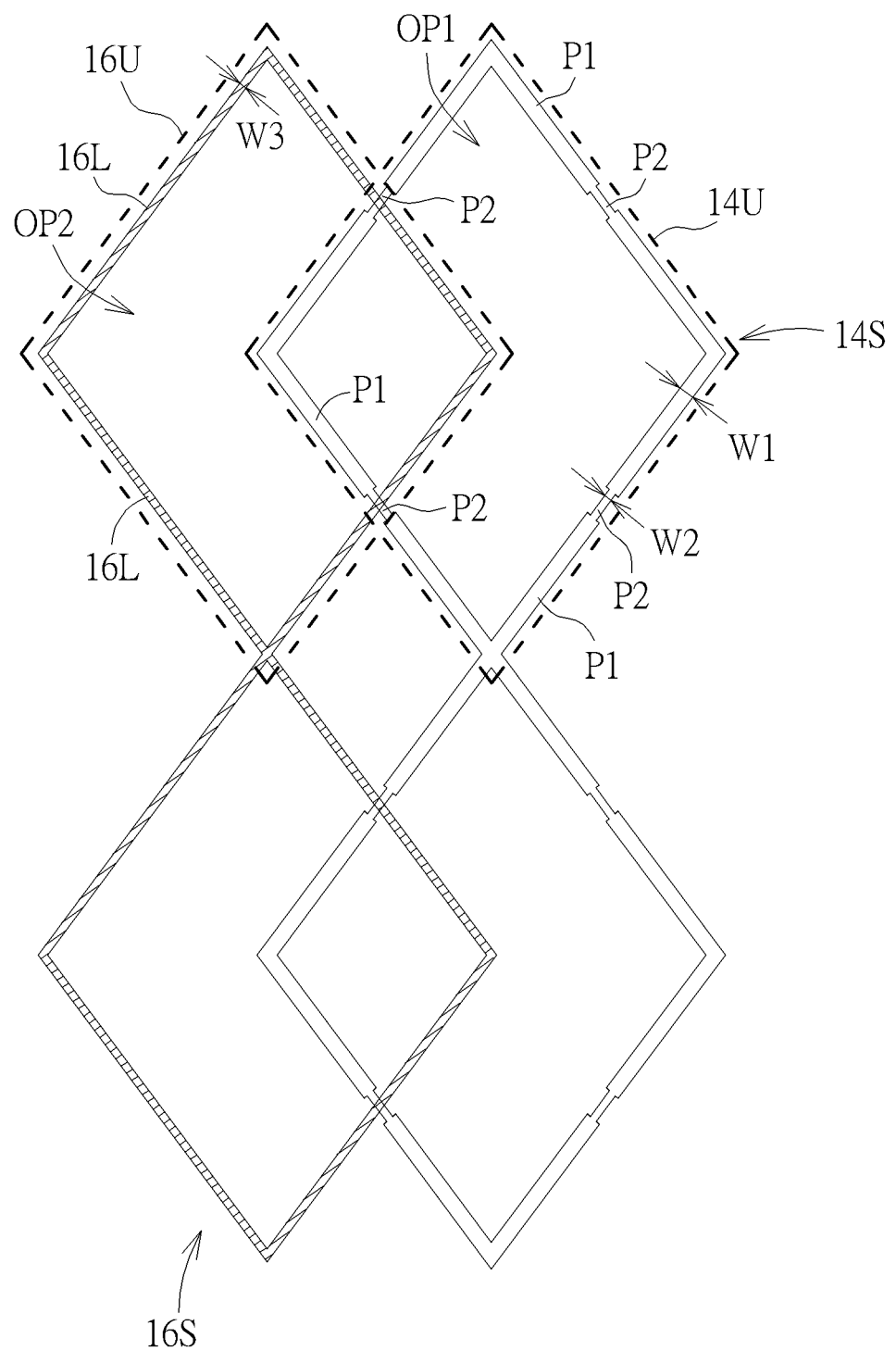
FIG. 2 illustrates an enlarged schematic diagram of mesh units of a transparent conductive layer and mesh units of a non-transparent conductive layer according to the first embodiment of the present disclosure.

Please refer to FIG. 1 and FIG. 2, wherein FIG. 1 illustrates a top view of a touch panel according to a first embodiment of the present disclosure, and FIG. 2 illustrates an enlarged schematic diagram of mesh units of a transparent conductive layer and mesh units of a non-transparent conductive layer according to the first embodiment of the present disclosure. In order to clearly illustrate patterns of the transparent conductive layer and the non-transparent conductive layer, FIG. 1 only illustrates the transparent conductive layer, the non-transparent conductive layer and the first substrate while omitting other film layers; however, the present disclosure is not limited thereto. A touch panel 1 includes a first substrate 12, a transparent conductive layer 14 and a non-transparent conductive layer 16. The first substrate 12 may for example be a cover of the touch panel 1 that is closest to an object, and the cover is used to protect the touch panel 1; the first substrate 12 may be a transparent substrate such as a glass substrate, a plastic substrate, an acrylic substrate, a quartz substrate, a sapphire substrate or other substrates with a high mechanical strength. The first substrate 12 has a touch region TR and a peripheral region (not illustrated), wherein the touch region TR is a region for users to execute touch operations, and the peripheral region is disposed on at least a side of the touch region for arranging peripheral circuitry. The transparent conductive layer 14 and the non-transparent conductive layer 16 are disposed on the first substrate 12. The transparent conductive layer 14 includes a plurality of first sensing electrode strips 14S extending along a first direction D1, each of the first sensing electrode strips 14S includes a plurality of first portions P1 and a plurality of second portions P2, and each of the second portions P2 connect adjacent two of the first portions P1 to each other. The non-transparent conductive layer 16 includes a plurality of second sensing electrode strips 16S extending along a second direction D2 different from the first direction D1, and each of the second sensing electrode strips 16S has a mesh pattern. Wherein, the first portions P1 do not overlap the non-transparent conductive layer 16, and the second portions P2 overlap the non-transparent conductive layer 16, as described in more detail below. In some embodiments, the first direction D1 may for example be perpendicular to the second direction D2, but not limited thereto. Each of the second sensing electrode strips 16S crosses each of the first sensing electrode strips 14S, such that the second sensing electrode strips 16S and the first sensing electrode strips 14S may be capacitively coupled to form a plurality of touch sensing units TU for detecting a position of an object touching or proximate to the touch panel 1. In some embodiments, the object may for example be a finger or a touch stylus with a diameter smaller than that of a finger. In some embodiments, the first sensing electrode strips 14S and the second sensing electrode strips 16S may respectively serve as driving electrodes for transmitting driving signals and sensing electrodes for detecting sensing signals, but not limited thereto. The first sensing electrode strips 14S and the second sensing electrode strips 16S may also respectively serve as sensing electrodes and driving electrodes. The transparent conductive layer 14 may include transparent conductive materials such as indium tin oxide, aluminum-doped zinc oxide (AZO), carbon nanotubes or conductive polymers, but not limited thereto. The non-transparent conductive layer 16 may include non-transparent conductive materials such as metals or metal alloys, but not limited thereto. Metals may for example include gold, silver, copper, aluminum, nickel, zinc or other suitable materials; therefore, a resistivity of the non-transparent conductive layer 16 is less than a resistivity of the transparent conductive layer 14. Spacing between adjacent two of the first sensing electrode strips 14S and spacing between adjacent two of the second sensing electrode strips 16S are not limited to those shown in FIG. 1, and may be adjusted based on practical requirements.

It is noted that, because one of the driving electrode and the sensing electrode uses the transparent conductive layer 14 instead of metal mesh, and another one of the driving electrode and the sensing electrode uses the non-transparent conductive layer 16, when comparing against a touch panel using metal mesh as both the driving electrode and the sensing electrode, the touch panel 1 of the present embodiment has a higher transmittance; or, a touch resolution may be increased (that is, a density of the touch sensing units TU may be increased) without drastically reducing the transmittance. In this manner, the same optical effects may be maintained; for example, when the touch panel 1 is disposed on a display surface of a display device, the touch panel 1 does not affect a brightness of a displayed image. Additionally, because the another one of the driving electrode and the sensing electrode is the non-transparent conductive layer 16 with low resistance, the resistive and capacitive load on the touch panel 1 would not be drastically increased, which in turn meets the demand of high touch resolution such as the touch resolution requirement of detecting the touch stylus.

In practice (as shown in FIG. 2), in each of the first sensing electrode strips 14S, four of the first portions P1 and four of the second portions P2 may be connected to form a mesh unit 14U, such that each mesh unit 14U has an opening OP1; the mesh units 14U may piece together into the first sensing electrode strip 14S. In the mesh pattern of the non-transparent conductive layer 16, each of the second sensing electrode strips 16S may include a plurality of mesh units 16U, and each of the mesh units 16U are formed of a plurality of straight metal mesh lines 16L connected into a circle, so as to have an opening OP2. Along a top view direction VD, the second portion P2 of the mesh unit 14U overlap the metal mesh line 16L of the mesh unit 16U, whereas the first portion P1 is located inside the corresponding opening OP2 of the mesh unit 16U. In some embodiments, a shape of the opening OP1 and a shape of the opening OP2 may for example be a diamond shape, a rectangular shape or other suitable shapes. In some embodiments, the shape of the opening OP1 may be different from the shape of the opening OP2. In the present embodiment, the first portion P1 and the second portion P2 may for example be a line segment, and a width W1 of the first portion P1 may be larger than a width W2 of the second portion P2. Therefore, the width W2 of the second portion P2 may be decreased when the coupling capacitance resulting from the second portion P2 of the first sensing electrode strip 14S overlapping the metal mesh line 16L of the second sensing electrode strip 16S is reduced; at the same time, the width W1 of the first portion P1 may be increased to make up for the reduced resistance of the second portion P2, so that a resistance of the first sensing electrode strip 14S is not lowered as the width W2 of the second portion P2 is decreased.

In the present embodiment, the metal mesh lines 16L may have a uniform width W3, but not limited thereto. Since light cannot pass through the non-transparent conductive layer 16, in order to avoid the user observing the metal mesh lines 16L, the width W3 of the metal mesh line 16L may be less than 30 micrometers, preferably less than micrometers, even less than 5 micrometers. In the present embodiment, two metal mesh lines 16L connected to each other may extend in different directions to have a turn or bend between them, so as to reduce a length of a single metal mesh line 16L extending along the same direction, thereby reducing visibility of the non-transparent conductive layer 16, but not limited thereto.

The description below will further detail a stacking structure of the touch panel 1. Please refer to FIG. 3, which illustrates a sectional view along a section line A-A' of FIG. 1. In the present embodiment, the first substrate 12 has a first surface 12a and a second surface 12b opposite each other; the first surface 12a is closer to the object than the second surface 12b, and the transparent conductive layer 14 and the non-transparent conductive layer 16 are disposed on the second surface 12b of the first substrate 12. In the present embodiment, the touch panel 1 may further include a second substrate 110, an insulating layer 18 and a blurring layer 112. The second substrate 110 is disposed facing the second surface 12b of the first substrate 12, the insulating layer 18 is disposed between the transparent conductive layer 14 and the non-transparent conductive layer 16 to electrically insulate the transparent conductive layer and the non-transparent conductive layer 16, and the non-transparent conductive layer 16, the insulating layer 18 and the transparent conductive layer 14 are formed on the second substrate 110 in sequence. The second substrate 110 may be a transparent substrate, such as a glass substrate, a plastic substrate, an acrylic substrate, a quartz substrate, a sapphire substrate or other substrates with high mechanical strength. In other words, the touch panel 1 of the present embodiment may also be called a glass-to-glass (GG) type touch panel. Because the transparent conductive layer 14 is disposed between the non-transparent conductive layer 16 and the first substrate 12, the visibility of the non-transparent conductive layer 16 may be reduced through the disposition of the transparent conductive layer 14, but not limited thereto. In some embodiments, the non-transparent conductive layer 16 may also be disposed between the transparent conductive layer 14 and the first substrate 12.

In the present embodiment, a function of the blurring layer 112 is to bend light, so that human eyes are not easy to focus on the non-transparent conductive layer 16, which in turn results in a blurring effect. In this manner, a contrast (or sharpness) between a region of the touch panel 1 with the non-transparent conductive layer 16 and another region of the touch panel 1 without the non-transparent conductive layer 16 may be reduced, so that the human eyes have difficulty focusing on the non-transparent conductive layer 16, which in turn reduces the visibility of the non-transparent conductive layer 16. The blurring layer 112 of the present embodiment may further include an adhesive material, so that the blurring layer 112 may stick the second substrate 110 and the first substrate 12 together, but not limited thereto. In some embodiments, the blurring layer 112 may also be a protective layer (an overcoat) that for example includes organic materials. In such a scenario, the touch panel 1 would further include an adhesive layer that sticks the first substrate 12 and the second substrate 110.

In the present embodiment, the touch panel 1 may optionally further include a first optical matching layer 114 disposed between the transparent conductive layer 14 and the first substrate 12 and between the insulating layer 18 and the first substrate 12. The first optical matching layer 114 may at least cover the touch region TR of the second surface 12b of the first substrate 12. Through the matching of refractive indices, light in the first optical matching layer 114 would have a phase difference that produce an interference effect; therefore, the first optical matching layer 114 may cause the reflectance of the region of the touch region TR with the non-transparent conductive layer 16 to be close to or equal to the reflectance of the region of the touch region TR without the non-transparent conductive layer 16, thereby reducing the visibility of the non-transparent conductive layer 16. For example, the first optical matching layer 114 may include magnesium fluoride ($MgF_2$), titanium dioxide ($TiO_2$), niobium oxide ($Nb_2O_5$), other suitable materials or stacks of any two or more of the aforementioned materials, but not limited thereto.

In some embodiments, the touch panel 1 may optionally further include a light-shielding layer 116 disposed between the non-transparent conductive layer 16 and the first substrate 12. For example, the light-shielding layer 116 may be formed on the non-transparent conductive layer 16 through a darkening process (such as a quench-polish-quench process), but not limited thereto. Through a disposition of the light-shielding layer 116, reflection of ambient light from the non-transparent conductive layer 16 that contains metal may be reduced, thereby reducing the visibility of the non-transparent conductive layer 16. A material of the light-shielding layer 116 may for example include metal oxide, but not limited thereto.

In some embodiments, the touch panel 1 may optionally further include an anti-reflective layer 118 disposed on the first surface 12a of the first substrate 12, which is used to reduce reflection of ambient light at an air/first substrate 12 interface, which in turn increases a clarity of images displayed on a touch display device. It is noted that, although the anti-reflective layer 118 reduces reflection at the air/first substrate 12 interface, refractive index matching of the first optical matching layer 114 (disposed between the non-transparent conductive layer 16 and the first substrate 12) and the transparent conductive layer 14 may drastically reduce a difference between the reflected light (and a chroma thereof) from the region of the touch panel 1 with the non-transparent conductive layer 16 and the region of the touch panel 1 without the non-transparent conductive layer 16, which in turn reduces the visibility of non-transparent conductive layer 16, as described in more detail below.

Figure 3:
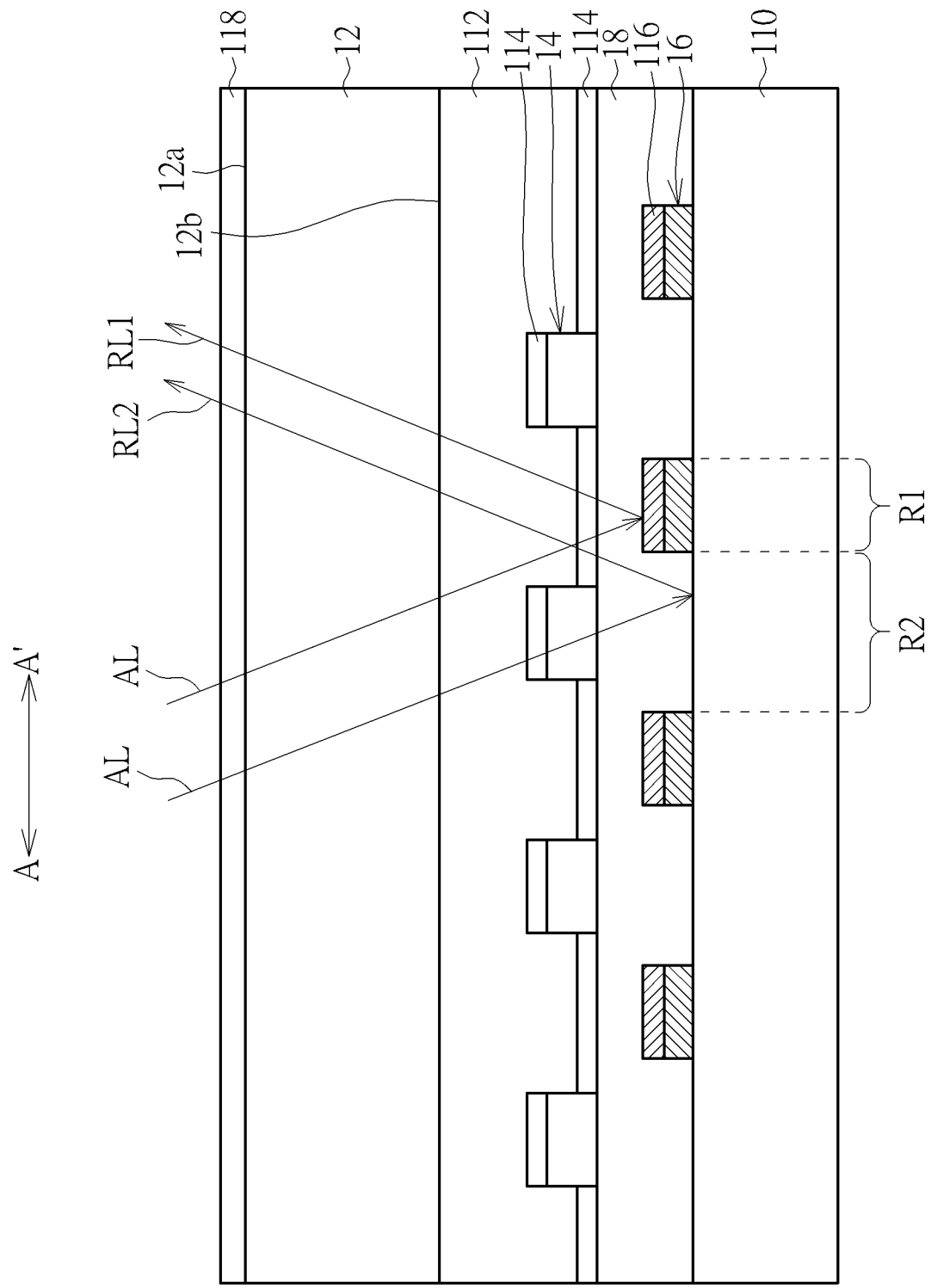
FIG. 3 illustrates a sectional view along a section line A-A' of FIG. 1.
Figure 4:
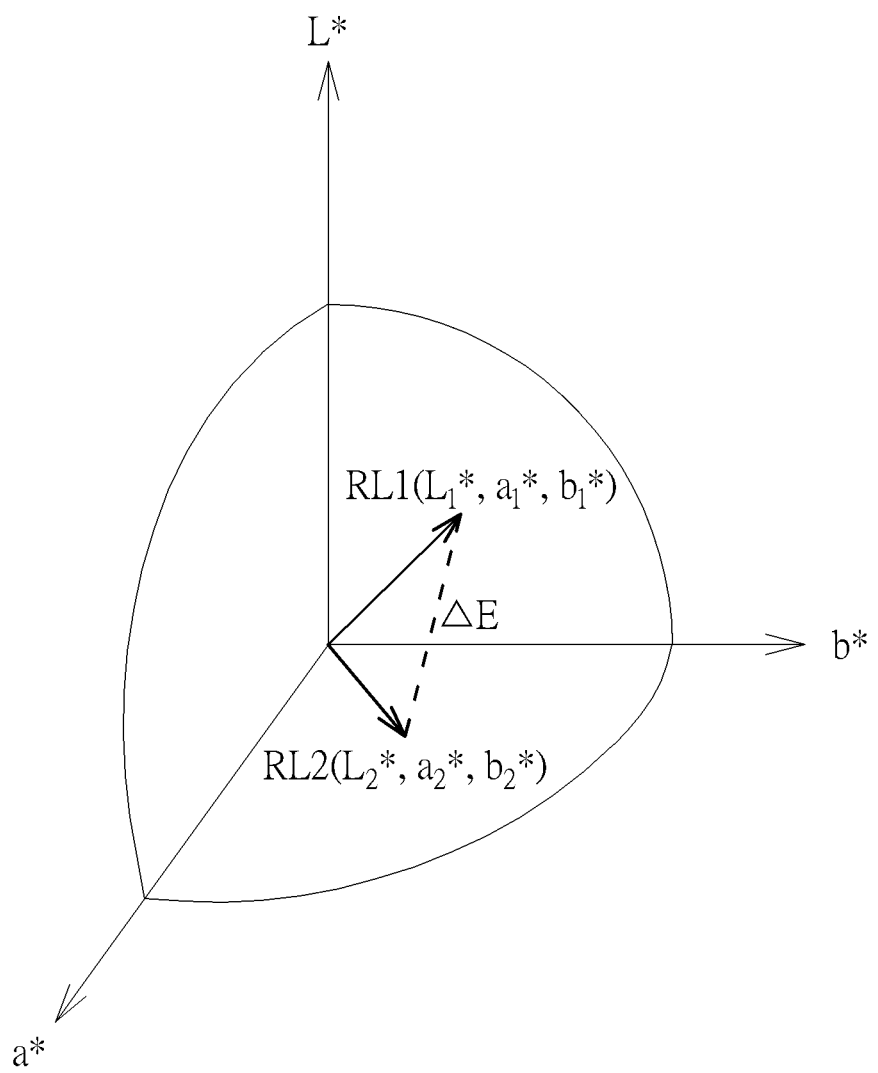
FIG. 4 illustrates CIELAB color space coordinates of different light reflected from a region of the touch panel with the non-transparent conductive layer and another region of the touch panel without the non-transparent conductive layer according to the present disclosure.
Figure 5:
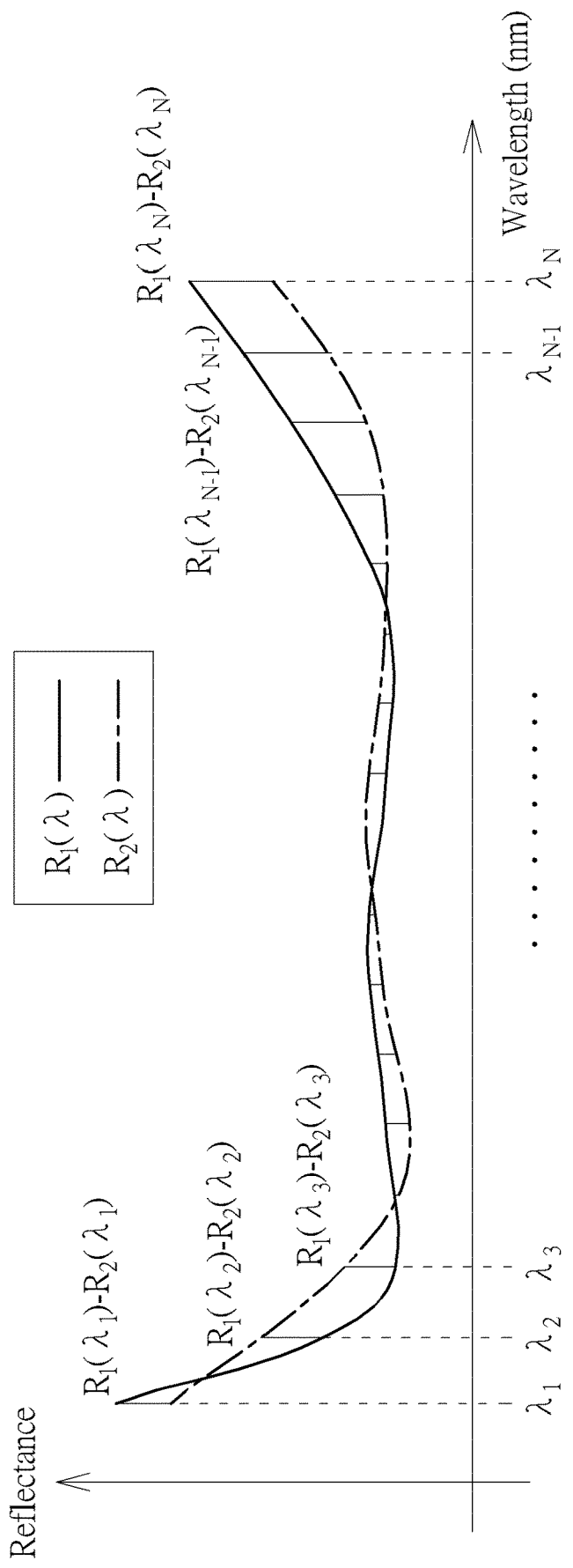
FIG. 5 illustrates a relationship between reflectance and wavelength of different light reflected from a region of the touch panel with the non-transparent conductive layer and another region of the touch panel without the non-transparent conductive layer according to the present disclosure.

Please refer to FIG. 4 and FIG. 5 while also referring to FIG. 3. FIG. 4 illustrates CIELAB color space coordinates (defined by the Commission Internationale d'Eclairage, CIE) of different light reflected from the region of the touch panel 1 with the non-transparent conductive layer 16 and the region of the touch panel 1 without the non-transparent conductive layer 16 according to the present disclosure. FIG. 5 illustrates relationships between reflectances and wavelengths of different light reflected from the region of the touch panel 1 with the non-transparent conductive layer 16 and the region of the touch panel 1 without the non-transparent conductive layer 16 according to the present disclosure. As shown in FIG. 3 and FIG. 4, when ambient light AL with the same conditions enter the touch panel 1, the region R1 of the touch panel 1 with the non-transparent conductive layer 16 and the region R2 of the touch panel 1 without the non-transparent conductive layer 16 would respectively reflect the ambient light AL as reflected light RL1 and RL2. The reflected light RL1 has a CIELAB coordinate of ($L_1^*$, $a_1^*$, $b_1^*$), and the reflected light RL2 has a CIELAB coordinate of ($L_2^*$, $a_2^*$, $b_2^*$). Therefore, using formula (1) shown below, a chroma difference ΔE between the reflected light RL1 and RL2 may be calculated.

$$\Delta E = \sqrt{(L_1^* - L_2^*)^2 + (a_1^* - a_2^*)^2 + (b_1^* - b_2^*)^2} \quad (1)$$

In the present embodiment, the chroma difference between the reflected light RL1 and RL2 (respectively resulting from the region R1 of the touch panel 1 with the non-transparent conductive layer 16 and the region R2 of the touch panel 1 without the non-transparent conductive layer 16 when reflecting the same light, such as ambient light AL) may be less than 3, preferably less than 1. Therefore, it is known that by means of the first optical matching layer 114 and the transparent conductive layer 14, the chroma difference between the region R1 and the region R2 may be noticeably reduced.

As shown in FIG. 3 and FIG. 5, a relationship between a wavelength of reflected light RL1 and a reflectance of the region R1 may be expressed as a curve $R_1(\lambda)$, and a relationship between a wavelength of reflected light RL2 and a reflectance of the region R2 may be expressed as a curve $R_2(\lambda)$. For example, the reflectance may be a ratio of an intensity of light RL1 or RL2 reflected from the corresponding region R1 or R2 to an intensity of light incident to the corresponding region R1 or R2, but not limited thereto. A difference in reflectance ΔR between the region R1 and the region R2 may be calculated by formula (2) below:

$$\Delta R = \frac{1}{N}[|R_1(\lambda_1) - R_2(\lambda_1)| + |R_1(\lambda_2) - R_2(\lambda_2)| + \ldots |R_1(\lambda_N) - R_2(\lambda_N)|], \quad (2)$$

wherein Δ is wavelength, $\Delta_1 \ldots \Delta_N$ are various wavelengths within a visible light spectrum, and N is a positive integer larger than 2. In the present embodiment, the visible light spectrum may for example be ranged from 380 nm to 780 nm, but not limited thereto. It is known from the formula (2) that the difference in reflectance ΔR is determined by taking absolute values of the differences between curve $R_1(\lambda)$ and $R_2(\lambda)$ at different wavelengths, and taking an average of a sum of the absolute values of the differences. Therefore, the difference in reflectance ΔR calculated by the formula (2) may effectively show a difference between the curves $R_1(\lambda)$ and $R_2(\lambda)$. In the present embodiment, a percentage difference in reflectance between the region R1 of the touch panel 1 with the non-transparent conductive layer 16 and the region R2 of the touch panel 1 without the non-transparent conductive layer 16 may be less than 6, preferably may be less than 3, and even more preferably may be less than 1. Therefore, it can be determined that by means of the first optical matching layer 114 and the transparent conductive layer 14, the difference in reflectance between the regions R1 and R2 may be noticeably reduced, which in turn reduces the visibility of the non-transparent conductive layer 14. Therefore, in the touch panel 1 of the present embodiment, by means of using the transparent conductive layer 14 and the non-transparent conductive layer 16 as the driving electrode and the sensing electrode, not only the transmittance is improved, but also the visibility issue of the non-transparent conductive layer 16 resulting from the disposition of the anti-reflective layer 118 may be more easily mitigated through the arrangement of the first optical matching layer 114 with the transparent conductive layer 14.

The touch panel of the present disclosure is not limited to the abovementioned embodiments; other embodiments of the present disclosure will be further described in the description below. To illustrate the differences between various embodiments, identical reference signs will be used to denote the same components/elements and descriptions regarding previously discussed components/elements will not be repeated.

Figure 6:
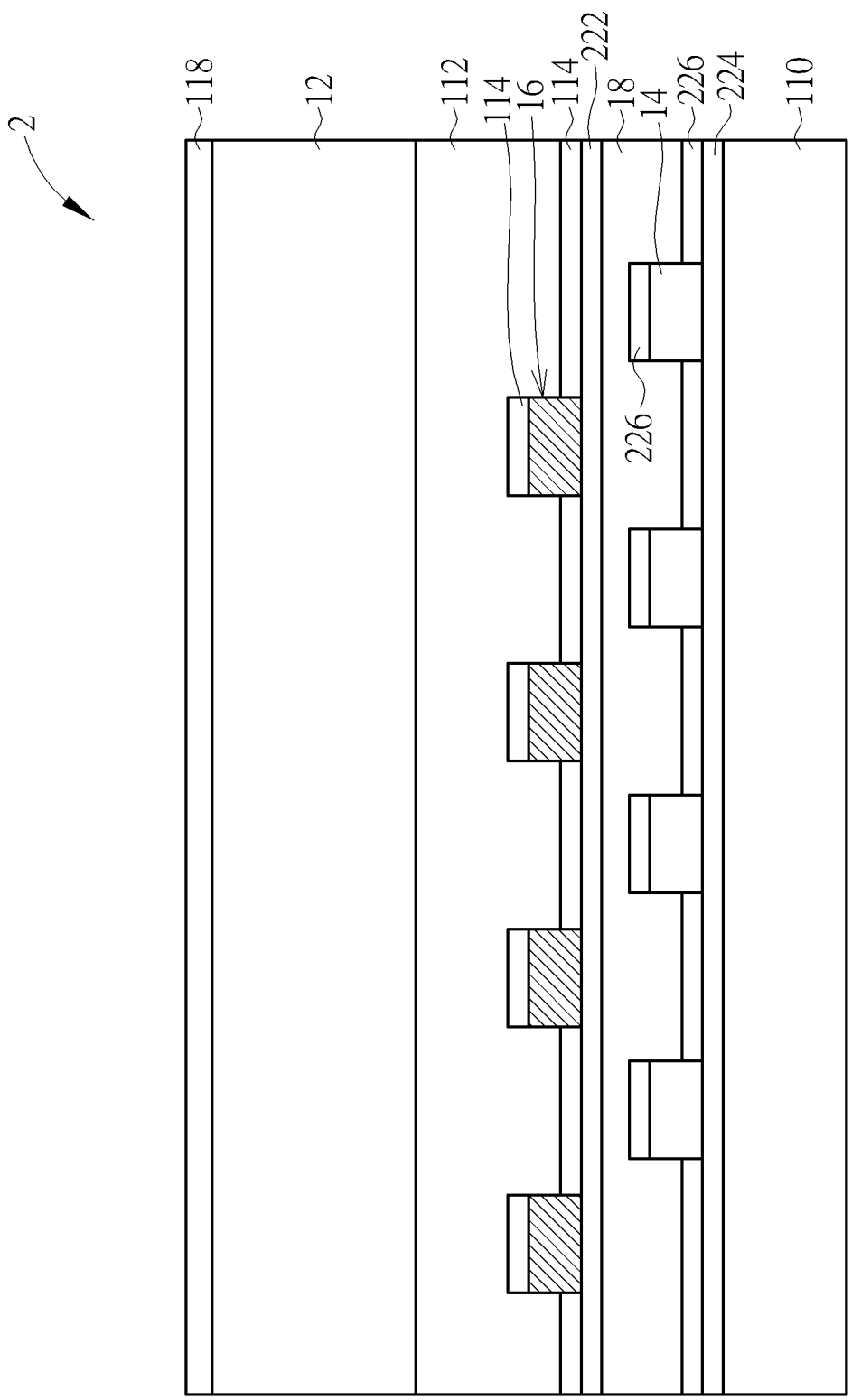
FIG. 6 illustrates a sectional view of the touch panel according to an alternative embodiment of the first embodiment of the present disclosure.

Please refer to FIG. 6, which illustrates a sectional view of the touch panel according to an alternative embodiment of the first embodiment of the present disclosure. In the present alternative embodiment, a touch panel 2 differs from the aforementioned embodiments in that positions of the non-transparent conductive layer 16 and the transparent conductive layer 14 of the touch panel 2 may be interchanged; that is, the non-transparent conductive layer 16 may be disposed between the transparent conductive layer 14 and the first substrate 12. In the present alternative embodiment, the first optical matching layer 114 may be disposed between the non-transparent conductive layer 16 and the blurring layer 112, for example being formed directly on the non-transparent conductive layer 16 and the insulating layer 18. The touch panel 2 of the present alternative embodiment may optionally further include a second optical matching layer 222, a third optical matching layer 224 and a fourth optical matching layer 226. The second optical matching layer 222 is disposed between the transparent conductive layer 14 and the non-transparent conductive layer 16. Specifically, the second optical matching layer 222 may be disposed between the insulating layer 18 and the non-transparent conductive layer 16. The third optical matching layer 224 may be disposed on a side of the transparent conductive layer 14 opposite to the non-transparent conductive layer 16, that is, between the transparent conductive layer 14 and the second substrate 110. The fourth optical matching layer 226 may be disposed between the insulating layer 18 and the transparent conductive layer 226. In some embodiments, the touch panel 2 may only include at least one of the first optical matching layer 114, the second optical matching layer 222, the third optical matching layer 224 and the fourth optical matching layer 226, so as to reduce the visibility of the non-transparent conductive layer 16. In some embodiments, when the transparent conductive layer 14 is between the non-transparent conductive layer 16 and the first substrate 12, the third optical matching layer 224, the non-transparent conductive layer 16, the fourth optical matching layer 226, the insulating layer 18, the second optical matching layer 222 and the first optical matching layer 114 may be formed on the second substrate 110 in sequence. In some embodiments, the second optical matching layer 222, the third optical matching layer 224 and the fourth optical matching layer 226 may have functions similar to that of the first optical matching layer 114, and may include magnesium fluoride ($MgF_2$), titanium dioxide ($TiO_2$), niobium oxide ($Nb_2O_5$), other suitable materials or stacks of any two or more of the aforementioned materials, but not limited thereto.

Figure 7:
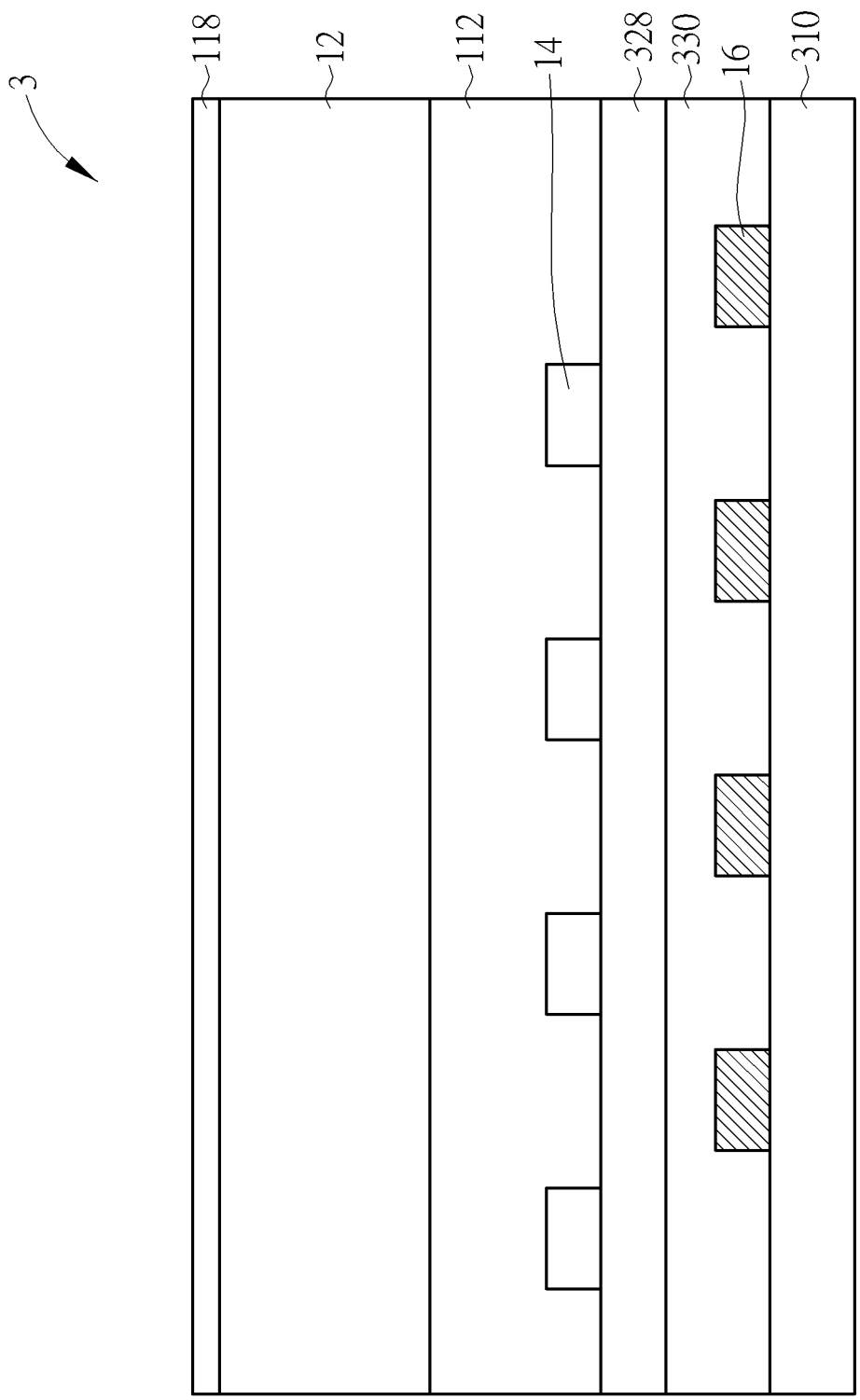
FIG. 7 illustrates a sectional view of the touch panel according to another alternative embodiment of the first embodiment of the present disclosure.

Please refer to FIG. 7, which illustrates a sectional view of the touch panel according to another alternative embodiment of the first embodiment of the present disclosure. In the present alternative embodiment, a touch panel 3 differs from the aforementioned embodiments in that the touch panel 3 further includes a third substrate 328 disposed between the first substrate 12 and the second substrate 310. In other words, the touch panel 3 of the present alternative embodiment may be called a glass-film-film (GFF) type touch panel. Specifically, the second substrate 310 and the third substrate 328 may be thin films that for example include polyimide (PI). In the present alternative embodiment, the transparent conductive layer 14 is directly formed on the third substrate 328, and the non-transparent conductive layer 16 is directly formed on the second substrate 310, but not limited thereto. Additionally, the second substrate 310 and the third substrate 328 may adhere to each other through an adhesive layer 330, so that at least one of the third substrate 328 and the adhesive layer 330 may be used to electrically insulate the transparent conductive layer 14 and the non-transparent conductive layer 16. In some embodiments, the non-transparent conductive layer 16 may be directly formed on the third substrate 328, and the transparent conductive layer 14 may be directly formed on the second substrate 310. In some embodiments, the touch panel 3 may not include an optical matching layer, or the touch panel 3 may include at least one optical matching layer from the abovementioned embodiments.

Figure 8:
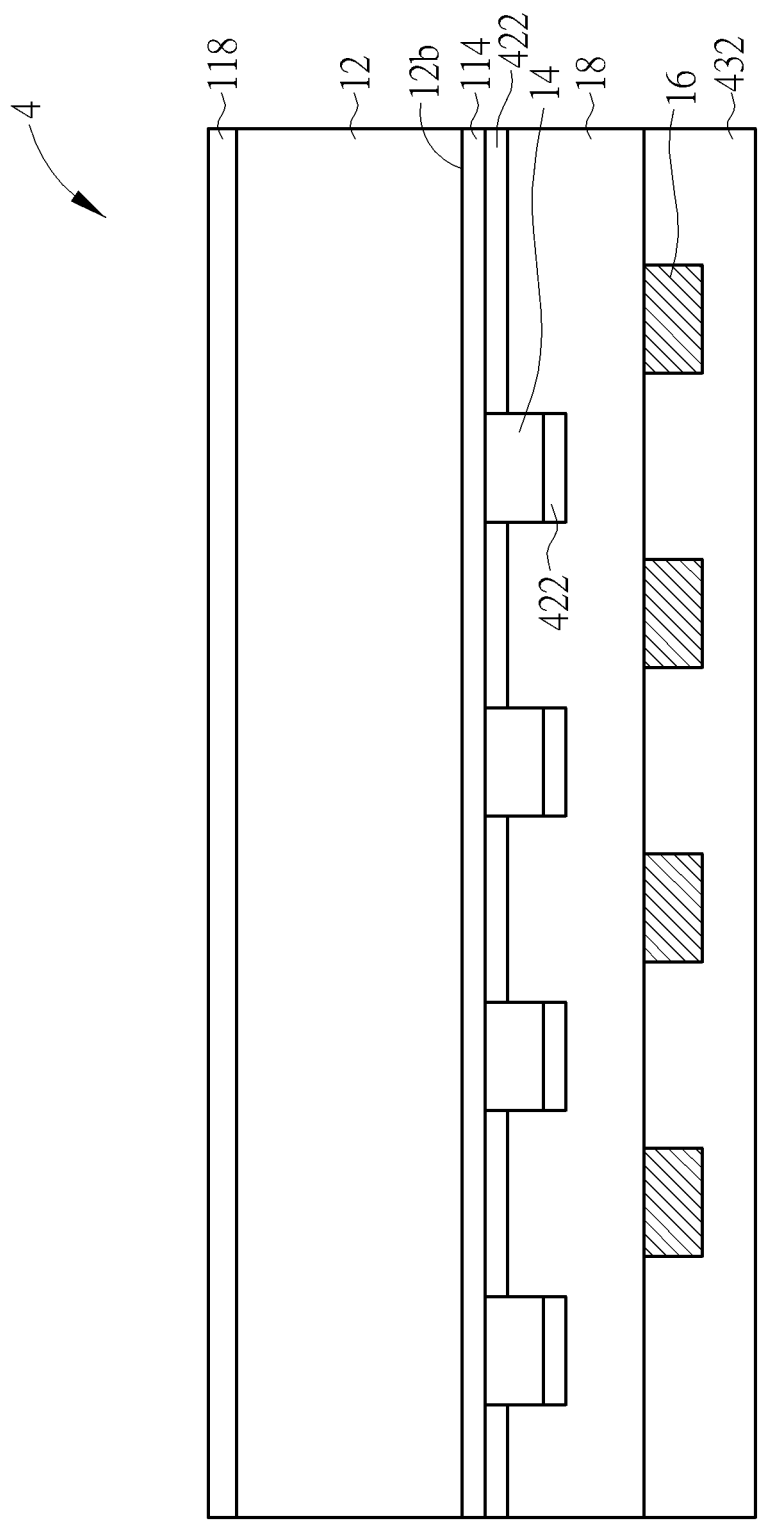
FIG. 8 illustrates a sectional view of the touch panel according to yet another alternative embodiment of the first embodiment of the present disclosure.

Please refer to FIG. 8, which illustrates a sectional view of the touch panel according to yet another alternative embodiment of the first embodiment of the present disclosure. In the present alternative embodiment, a touch panel 4 differs from the aforementioned embodiments in that the transparent conductive layer 14 and the non-transparent conductive layer 16 are directly formed on the second surface 12b of the first substrate 12. In other words, the touch panel 4 of the present alternative embodiment may be called a one-glass-solution (OGS) type touch panel. In the present alternative embodiment, the transparent conductive layer 14, the insulating layer 18 and the non-transparent conductive layer 16 may be formed on the second surface 12b in sequence, and the touch panel 4 further includes a protective layer 432 covering the non-transparent conductive layer 16 to protect the transparent conductive layer 14 and the non-transparent conductive layer 16. In some embodiments, the first optical matching layer 114 may be optionally disposed between the transparent conductive layer 14 and the first substrate 12; the second optical matching layer 422 may be optionally disposed between the transparent conductive layer 14 and the insulating layer 18, but not limited thereto. In some embodiments, the touch panel 4 may also include at least one of the first optical matching layer 114, the second optical matching layer 422, the third optical matching layer 224 and the fourth optical matching layer 226. In some embodiments, the touch panel 4 may not include an optical matching layer.

Figure 9:
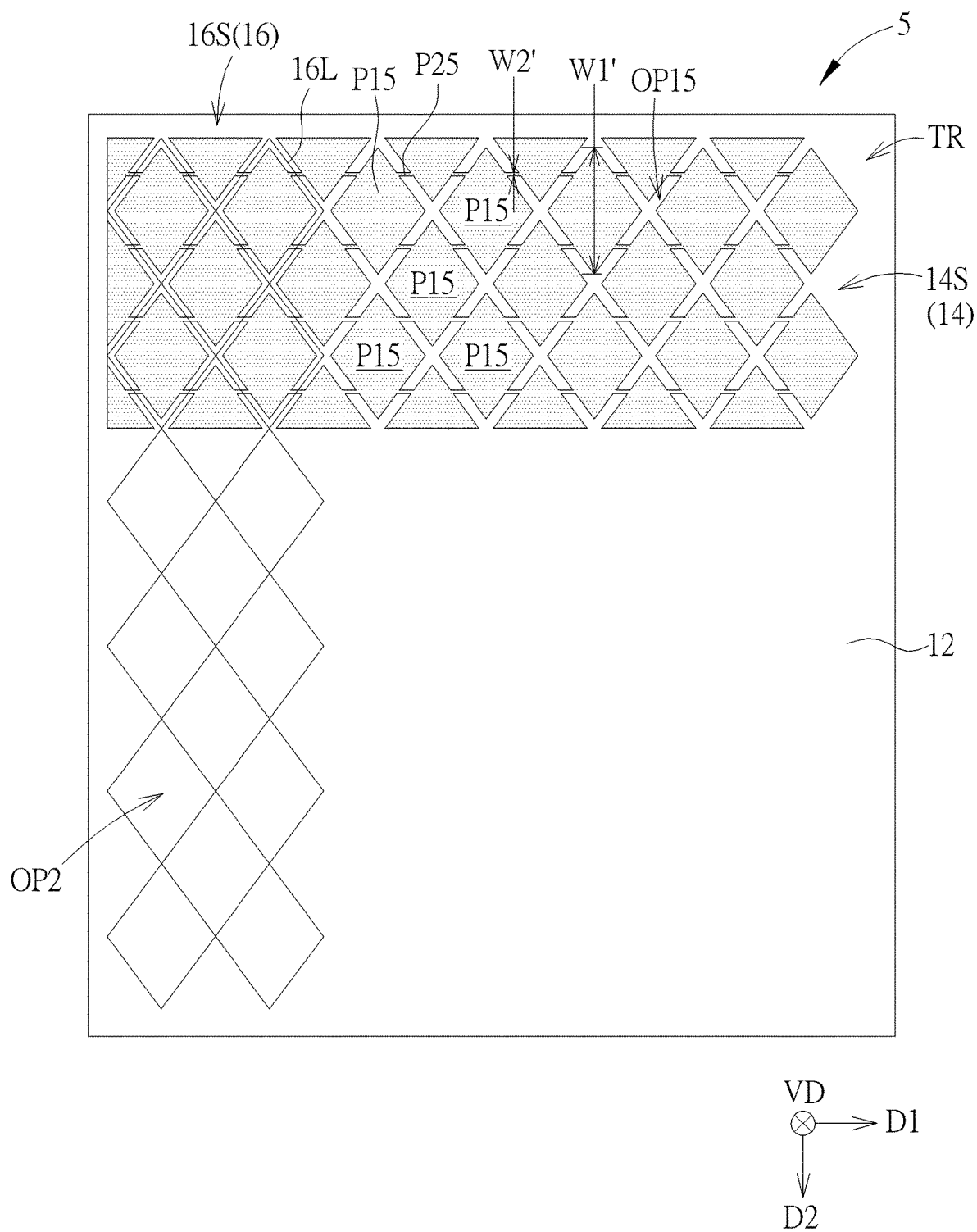
FIG. 9 illustrates a top view of the touch panel according to a second embodiment of the present disclosure.

Please refer to FIG. 9, which illustrates a top view of the touch panel according to a second embodiment of the present disclosure. In order to clearly illustrate the first sensing electrode strips and the second sensing electrode strips, FIG. 9 only illustrates a single first sensing electrode strip and a single second sensing electrode strip, but the present disclosure is not limited thereto. The touch panel 5 of the present embodiment differs from the abovementioned embodiments in that an area of the first portion P15 may be equal to or smaller than an area of the corresponding opening OP2. When the area of the first portion P15 is identical to the area of the corresponding opening OP2, the area of the first portion P15 that does not overlap the second sensing electrode strip 16S may be maximized. In this manner, the width of the first portion P15 may be much larger than the width of the second portion P25, so that the resistance of the first sensing electrode strip 14S may be drastically reduced; or, under a condition that the touch resolution is increased, the resistance of the first sensing electrode strip 14S may not be increased. The area of the first portion P15 may also be adjusted to be smaller than the area of the corresponding opening OP2 based on practical demands of the resistive and capacitive load, while keeping the width W1' of the first portion P15 to be larger than the width W2' of the second portion P25 along the same direction (such as the second direction D2). In the present embodiment, a shape of an opening OP15 of the first sensing electrode strip 14S may for example be an X shape, but not limited thereto. In some embodiments, a stacking structure of the touch panel 5 of the second embodiment may also adopt the stacking structure of anyone of the aforementioned embodiments or alternative embodiments.

In summary, in the touch panel of the present disclosure, by using the transparent conductive layer and the non-transparent conductive layer as the driving electrode and the sensing electrode, the transmittance of the touch panel may be improved, or the touch resolution may be increased without drastically reducing the transmittance, thereby maintaining the same optical effects. Furthermore, because the non-transparent conductive layer may be metal mesh, the resistive and capacitive load on the touch panel would not be drastically increased, which in turn meets the demand of high touch resolution. Additionally, because the touch panel of the present disclosure only has one non-transparent conductive layer, the visibility issue of the non-transparent conductive layer resulting from the disposition of the anti-reflective layer may be more easily mitigated through the arrangement of the optical matching layers with the transparent conductive layer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel for detecting a position of an object, comprising:
    a first substrate having a first surface and a second surface opposite to the first surface, and the first surface is closer to the object than the second surface;
    a transparent conductive layer disposed on the second surface of the first substrate, the transparent conductive layer comprising a plurality of first sensing electrode strips extending along a first direction, each of the first sensing electrode strips comprising a plurality of first portions and a plurality of second portions, and each of the second portions connecting adjacent two of the first portions to each other; and
    a non-transparent conductive layer disposed on the second surface of the first substrate, the non-transparent conductive layer comprising a plurality of second sensing electrode strips extending along a second direction, and each of the second sensing electrode strips has a mesh pattern;
    wherein the first portions do not overlap the non-transparent conductive layer, and the second portions overlap the non-transparent conductive layer.

2. The touch panel of claim 1, further comprising an anti-reflective layer disposed on the first surface of the first substrate.

3. The touch panel of claim 1, wherein a width of one of the first portions is larger than a width of one of the second portions.

4. The touch panel of claim 1, wherein each of the second sensing electrode strips has a plurality of openings, and an area of one of the first portions is equal to or smaller than an area of one of the openings.

5. The touch panel of claim 1, wherein a percentage difference in reflectance between a region of the touch panel with the non-transparent conductive layer and another region of the touch panel without the non-transparent conductive layer is less than 3.

6. The touch panel of claim 1, wherein a region of the touch panel with the non-transparent conductive layer and another region of the touch panel without the non-transparent conductive layer have a difference in chroma when reflecting a same light, and the difference in chroma is less than 3.

7. The touch panel of claim 1, wherein one of the transparent conductive layer and the non-transparent conductive layer is disposed between the first substrate and another one of the transparent conductive layer and the non-transparent conductive layer.

8. The touch panel of claim 7, further comprising a first optical matching layer disposed between the first substrate and the one of the transparent conductive layer and the non-transparent conductive layer, wherein the first optical matching layer at least covers the second surface.

9. The touch panel of claim 7, further comprising a second optical matching layer disposed between the transparent conductive layer and the non-transparent conductive layer.

10. The touch panel of claim 7, further comprising a third optical matching layer disposed on a side of the one of the transparent conductive layer and the non-transparent conductive layer opposite to the another one of the transparent conductive layer and the non-transparent conductive layer.

11. The touch panel of claim 1, further comprising a second substrate and a blurring layer, the second substrate being disposed opposite to the second surface of the first substrate, the transparent conductive layer and the non-transparent conductive layer being directly formed on the second substrate, and the blurring layer being disposed between the non-transparent conductive layer and the first substrate.

12. The touch panel of claim 11, wherein the blurring layer comprises an adhesive material, and the blurring layer sticks the second substrate and the first substrate together.

13. The touch panel of claim 11, further comprising an insulating layer disposed between the transparent conductive layer and the non-transparent conductive layer.

14. The touch panel of claim 1, further comprising a second substrate and a third substrate, the third substrate being disposed between the first substrate and the second substrate, one of the transparent conductive layer and the non-transparent conductive layer being directly formed on the second substrate, and another one of the transparent conductive layer and the non-transparent conductive layer being directly formed on the third substrate.

15. The touch panel of claim 1, wherein the transparent conductive layer and the non-transparent conductive layer are directly formed on the first substrate.

* * * * *